United States Patent
Bell et al.

(10) Patent No.: US 7,234,313 B2
(45) Date of Patent: Jun. 26, 2007

(54) HVAC MONITOR AND SUPERHEAT CALCULATOR SYSTEM

(75) Inventors: Brian D. Bell, Wheat Ridge, CO (US); Hans Becker, Dubuque, IA (US)

(73) Assignee: Stargate International, Inc., Parker, CO (US)

( * ) Notice: Subject to any disclaimer, the term of this patent is extended or adjusted under 35 U.S.C. 154(b) by 116 days.

(21) Appl. No.: 10/980,573

(22) Filed: Nov. 2, 2004

(65) Prior Publication Data

US 2006/0090484 A1    May 4, 2006

(51) Int. Cl.
*G01K 13/00* (2006.01)
*F25B 41/00* (2006.01)

(52) U.S. Cl. ............... 62/129; 62/208; 62/212; 62/225; 236/51

(58) Field of Classification Search ............ 62/126, 62/129, 225, 208, 209, 210, 211, 212, 213; 236/51
See application file for complete search history.

(56) References Cited

U.S. PATENT DOCUMENTS

| | | | |
|---|---|---|---|
| 4,106,306 A | 8/1978 | Saunders | |
| 4,114,448 A | 9/1978 | Merritt | |
| 4,325,223 A | 4/1982 | Cantley | |
| 4,334,275 A | 6/1982 | Levine | |
| 4,381,549 A | 4/1983 | Stamp, Jr. et al. | |
| 4,467,613 A | 8/1984 | Behr et al. | |
| 4,591,093 A | 5/1986 | Elliott | |
| 4,611,470 A | 9/1986 | Enstrom | |
| 4,636,093 A | 1/1987 | Nagasaka | |
| 4,745,767 A * | 5/1988 | Ohya et al. ............... | 62/211 |
| 4,798,055 A | 1/1989 | Murrey et al. | |
| 4,841,733 A | 6/1989 | Dussault et al. | |
| 5,104,037 A | 4/1992 | Karg et al. | |
| 5,209,076 A | 5/1993 | Kauffman et al. | |
| 5,209,400 A | 5/1993 | Winslow et al. | |
| 5,311,745 A | 5/1994 | Lockhart et al. | |
| 5,449,112 A | 9/1995 | Heitman et al. | |
| 5,786,525 A | 7/1998 | Freund et al. | |
| 6,105,379 A * | 8/2000 | Alsenz et al. ............... | 62/225 |
| 6,128,910 A | 10/2000 | Faircloth | |
| 6,370,889 B2 * | 4/2002 | Okazaki et al. ............ | 62/119 |
| 6,505,475 B1 | 1/2003 | Zugibe et al. | |
| 6,571,566 B1 * | 6/2003 | Temple et al. ............ | 62/129 |
| 2004/0008113 A1 | 1/2004 | Pradhan et al. | |
| 2004/0146085 A1 | 7/2004 | Linder et al. | |
| 2004/0158359 A1 | 8/2004 | Frecska et al. | |

OTHER PUBLICATIONS

DIGI-Cool website, Digital Refrigeration System Analyzer, http://www.digi-cool.com, accessed Aug. 12, 2004, believed to be added to the website Aug. 5, 2003, 2 pages.
TESTO website, testo 551, 555, 560 Electronic Manifolds, http://www.testo.com, accessed Aug. 12, 2004, believed to be added to the website Mar. 19, 2004, 5 pages.

(Continued)

*Primary Examiner*—Marc Norman
(74) *Attorney, Agent, or Firm*—Sheridan Ross P.C.

(57) ABSTRACT

The present invention relates to a monitoring system for connection to an air conditioning system. The monitoring system includes a primary monitor for sensing the suction temperature and suction pressure of the air conditioning system along with the air conditioning unit temperature. In addition, the monitoring system includes a remote sensing device that is placed in the structure to monitor and transmit return air temperature and relative humidity to the primary monitor. The collected data is then used to calculate the superheat condition of the air conditioning system which is related to its efficiency.

15 Claims, 4 Drawing Sheets

OTHER PUBLICATIONS

Consolidated Energy Solutions, Inc. website, http://www.cesgetexcited.com, "Energy Saving Superheat Sensor Technology for Improving Supermarket Refrigeration & HVAC Systems", accessed Aug. 11, 2004, believed to be added to the website Feb. 28, 2001, 5 pages.

Blake, S., "Superheat Control—New Strategy Aims to Make Supermarket Refrigeration Systems Work Better", HVAC/Refrigeration, May 2000, 2 pages.

TESTO website, testo 925 type thermocouple thermometer, audible alarm, with battery and calibration document, http://www.testo.us, accessed Nov. 8, 2006, 5 pages.

* cited by examiner

HVAC MONITOR AND SUPERHEAT CALCULATOR SYSTEM

FIELD OF THE INVENTION

The present invention relates to a monitoring device for connection to an air conditioning unit that includes a remote sensing unit. One embodiment of the present invention is designed to monitor the superheat temperature of the air conditioning unit to assess its operating efficiency.

BACKGROUND OF THE INVENTION

Air conditioning units are commonplace in many of today's residential and commercial structures. These systems generally employ a conduit filled with a thermally conductive coolant, such as freon, which is subjected to at least two heat exchanges that transfer the heat from inside the structure to the outside. The conduit transfers high pressure, low temperature liquid coolant to an expansion valve wherein the pressure of the coolant is reduced, thereby lowering the temperature of the coolant. This low pressure, low temperature coolant is then directed into an evaporator, which is generally a system of coiled tubes, that act as a heat exchanger. More specifically, the fluid in the evaporator is exposed to warm return air that has been circulated through the structure, thus transferring the heat of a warm return air to the coolant in the evaporator. The now cooled air is directed through the structure, in various ways known in the field, where it will be warmed by the atmosphere into where it has been introduced and subsequently returned to the evaporator. The process of evaporation changes the coolant in the evaporator from a liquid to a vapor. That vapor is directed to a compressor, which operates on the vapor to increase the pressure and temperature thereof. The high temperature, high pressure vapor exiting the compressor is then directed to a condenser that transforms the vaporized coolant into a low temperature liquid. The condenser is much like the evaporator, in that a series of coils are provided to form a heat exchanger. A fan adjacent to the condenser blows ambient air past the high temperature, high pressure vaporized coolant in the coils, thus transferring the heat energy of the various coolant to exhaust air, transforming the vaporized coolant back into a liquid to complete the coolant loop.

The evaporator of the air conditioning system is designed to convert liquid coolant to vapor such that at the exit, or low pressure side of the evaporator contains only vaporized coolant. More specifically, it is desirable to maintain an operating condition wherein the evaporator efficiency changes liquid coolant into vapor such that the temperature at the low pressure end of the evaporator is the saturation temperature of the coolant. As those in the field will appreciate the saturation temperature of the coolant is dependent on various properties of the parts where coolant employed and is generally considered the temperature at which the coolant changes from a vapor to a liquid.

Air conditioning systems often do not operate at peak efficiency. For example, the liquid coolant may be evaporated too quickly, prior to the exit of the evaporator, such that a portion of the evaporator contains superheated coolant vapor. This condition results in a drop in efficiency of the overall air conditioning system since reduced heat transfer occurs between the warm return air and the fluid and/or vapor in the evaporator. Alternatively, if the heat transfer is insufficient to boil all the coolant prior to it reaching the evaporator exit, fluid may be directed into the compressor which is detrimental to its overall operation.

In order to maintain optimum cooling efficiency, technicians are often employed to periodically monitor and maintain air conditioning systems. Efficiency is commonly assessed by monitoring the superheat temperature of the air conditioning unit which, as those in the field appreciate, is equal to the suction temperature of the system minus the saturation suction temperature. The suction temperature is the temperature of the low pressure side of the system, usually but not always measured at the exit of the evaporator. The saturation suction temperature is a function of the pressure at the low pressure end of the evaporator. More specifically, the pressure at the evaporator exit may be monitored, and depending on the type of coolant in the system, the saturation suction temperature may be calculated.

It is considered by those in the field desirable to have an optimum superheat condition in the unit, which is the temperature of the coolant at the low pressure end of the evaporator. If the superheat temperature is too high, the use of the coil is not maximized, wherein the fluid evaporates too quickly and efficient heat transfer is not achieved. Alternatively, if the superheat temperature is too low, the coolant is not efficiently evaporating in the coil and coolant may then be transferred to the compressor, which is detrimental to the components therein. A superheat condition of zero is ideal, since that indicates the suction temperature of the system is equal to the temperature at which the coolant changes from a liquid to a vapor, thus indicating that the liquid coolant was efficiently transferred to vapor coolant at the proper place in the coolant loop. However, one skilled in the art will appreciate that this condition is not easily attained due to inefficiencies of any air conditioning system, such that acceptable superheat ranges for each air conditioning unit are generally used.

Devices of the prior art monitor the suction temperature and the suction pressure of air conditioning systems. They often also monitor other temperatures around the air conditioning coolant loop to assess the efficiency of the system. However, monitors of the prior art are commonly one-piece units such that a technician must make judgments where to place temperature and/or pressure sensors. In addition, a plurality of readings at various locations are usually required. In the prior art, these measurements are taken in series by a technician. This process is both time consuming to the technician and fosters inaccuracies in the superheat calculation, as measurement values may change due to the passage of time during the data collection process.

SUMMARY OF THE INVENTION

It is one aspect of the present invention to provide a monitoring system for connection with an air conditioning unit. One embodiment of the present invention includes a remote sensing unit for placement within the return air flow of the air conditioning system. Thus, an air conditioner technician may efficiently and virtually simultaneously monitor two locations of the system without having to move therebetween. The entire operation is thus more efficient and accurate and costs less time and money to employ. One embodiment of the present invention includes a monitor with at least three sensors in communication therewith. Temperature and pressure sensors are connected to the low pressure, or exit side of an air conditioner's evaporator. Further, a unit temperature sensor for the monitoring of the temperature of the air conditioning system that is external to a structure is provided. In addition, a remote sensing unit is provided that includes a temperature/relative humidity probe that is placed within the return air flow of the air conditioning system inside the structure. The remote sensing unit also may include an auxiliary temperature probe for the monitoring of other temperatures around the coolant loop.

The data collected from the remote sensing unit is directed via radio waves or other similar type of communication method to the primary monitor. Data related to the superheat condition of the system is then calculated by the monitor. The temperature and relative humidity data from the remote sensing unit and the unit temperature reading are then used in comparison with the superheat calculation to provide possible diagnoses related to inefficiencies of the air conditioning system so that repairs or adjustments may be performed.

It is thus one aspect of the present invention to provide a device that monitors the saturation pressure, suction temperature and unit temperature of the air conditioning system while remotely monitoring other system parameters. More specifically, one embodiment of the present invention is a handheld monitor that is powered by a battery. The monitor includes ports for the connection of lines that are in turn connected to various temperature or pressure sensing devices. The monitor also includes a user interface for the initiation and cessation of monitoring activities, inputting and outputting of data, and monitoring of data. One embodiment of the present invention utilizes a plurality of buttons for these operations. In addition, a screen may be employed that displays a superheat condition of the system, a client code, a date, a time, a pressure reading, a temperature reading, a refrigerant constant, etc. The monitor includes an antenna for receiving data from the remote sensing unit. Although a handheld unit is employed as one preferred monitoring device, one skilled in the art will appreciate that any type of monitoring unit may be used without departing from the scope of the invention. The monitoring unit of one embodiment has sufficient computer processing ability to calculate the superheat condition, among other things. Thus, one skilled in the art will appreciate that a variety of computer systems may be used, or alternatively, the monitor may be a data gathering mechanism that interfaces with another system at the end of the testing for future analysis.

It is yet another aspect of the present invention to provide a remote sensing unit. This portion of the monitoring system includes a probe for the monitoring of temperature and relative humidity of the warm return air of the air conditioning system. The data gathered by the probe is then directed to the remote sensing unit.

The remote sensing unit may also include an auxiliary temperature probe jack for the connection of another temperature probe. Finally, the remote sensing unit includes a transmitting antenna for sending the collected data to the primary monitor. The remote sensing unit is placed inside the structure being assessed such that real time information with respect to return air temperature and humidity may be gathered without having to obtain direct measurements at that location. The technician is thus able to monitor other conditions of the air conditioning system from an outside or other remote location. Thus, time is saved wherein the technician does not have to walk around to various locations to perform his or her duties facilitating accuracy in superheat calculations.

Although electrical conducting lines have been shown thus far connecting various probes and sensors to various monitors, one skilled in the art will appreciate that the sensors may also be adapted to transmit their gathered data to their respective monitors in other ways, such as by radio transmission. More specifically, one skilled in the art will appreciate that transmitting sensing devices may be employed such that the sensors may remain in place. Thus, these static sensors may be remotely activated when a technician enters a work site. The advantages of this embodiment of the present invention are easily seen in the arena of large scale structures, such as high rise buildings, wherein the air conditioning system is vast. Remotely placed sensors, or sensors integrated into the a/c system, would be advantageous since the technician may monitor the required data w/o entering the building. Alternatively, the placement of many sensors along with many data gatherings steps would be required to achieve the same result. The sensors of this embodiment of the present invention transmit their data through light, fiber optic lines, laser, electric lines, radio transmissions, microwave transmissions, or any other similar type of transmission mechanism that would remotely transmit data from the sensors to the monitoring unit. Although designed to be placed in the structure and then removed after test completion, the remote sensing unit such as described herein may be permanently placed inside the structure such that the technician does not have to ever enter the structure to obtain data. More specifically, the remote sensing unit is designed to be relatively inexpensive to manufacture, thus, it can be integrated in air conditioning systems wherein the subsequent data transmissions would be initiated by the primary monitor when a technician returned to the structure. Alternatively, this sensing unit could be associated with other componentry that allows it to transmit information to and receive information from a remote station. In this embodiment, the device could be used to constantly monitor the air conditioning system so that technicians could identify system problems whenever they might occur. More specifically, the data may be collected by a remote monitor and sent via ground lines, radio waves, laser, satellites, etc. to a monitoring station inside the building or at another location.

It is another aspect of the present invention to provide a monitoring unit that is easily used. More specifically, one embodiment of the present invention easily connects to the air conditioning system, decreases monitoring time and removes judgment calls usually made by the technicians. The temperature sensors and pressure sensors of one embodiment of the present invention are easily connected to the conduits of the air conditioning system. One embodiment of the present invention uses magnetized connectors that easily connect with the conduit or external portions of the air conditioning unit. The unit temperature probe of one embodiment of the present invention includes a C-clamp that connects onto the housing of the air conditioning unit generally found outside of the structure.

The system of the present invention also saves time such that any acceptable reading of superheat condition can be obtained within about seven minutes. In operation, one embodiment of the present invention analyzes the condition of an operating air conditioning system over a predetermined time. The data is then gathered by the monitoring system either via hard lines or by radio signals such that the superheat condition and possible diagnosis to any problems may be quickly and accurately obtained.

Finally, the system may generate possible diagnoses related to air conditioning system inefficiencies, such that the technician does not have to make judgment calls relevant to possible repairs to the air conditioning system. For example, manufacturers may alter the efficiency of the air conditioning system by changing various parameters such as the speed or efficiency of the fans, the operation of the compressor, the removal of clogs in the condenser or evaporator, the amount of coolant in the system, and the operation of the expansion valve. In the past, technicians had to make changes to the system in a hit or miss fashion to try to maximize system efficiency. The present invention may provide a diagnostic function that allows the technician to narrow down the possible problems within the air conditioning system and thus repair them quickly.

It is yet another aspect of the present invention to provide a monitoring system that is easy to manufacture. More specifically, embodiments of the present invention are constructed of common materials, sensors and displays, such that the manufacture of the unit is relatively inexpensive. In addition, a preferred embodiment of the system is designed to be battery powered, such that it is totally autonomous, thus removing the need for power lines. Obviously, hard lines could also alternatively be used to power the system or components thereof.

It is still yet another aspect of the present invention to provide a monitoring system that may be used with any air conditioning system. Prior art monitoring systems require that the technician input various parameters related to the air conditioning system being tested. For example, a technician would have to ascertain the proper parameters related to each air condition system that are dependent on the model type and manufacturer. These constants were then inputted into the unit and, along with the various temperature and pressure readings obtained, were used to obtain the superheat calculation and any system malfunction diagnosis. The present invention does not require input of such component data and may be used with any type of air conditioning system regardless of manufacturer. Thus, the present invention may be used in any location for any type of air conditioning system which makes it desirable since probabilities of errors in entering manufacturer or model specific parameters is eliminated.

The summary of the invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

Figure 1:
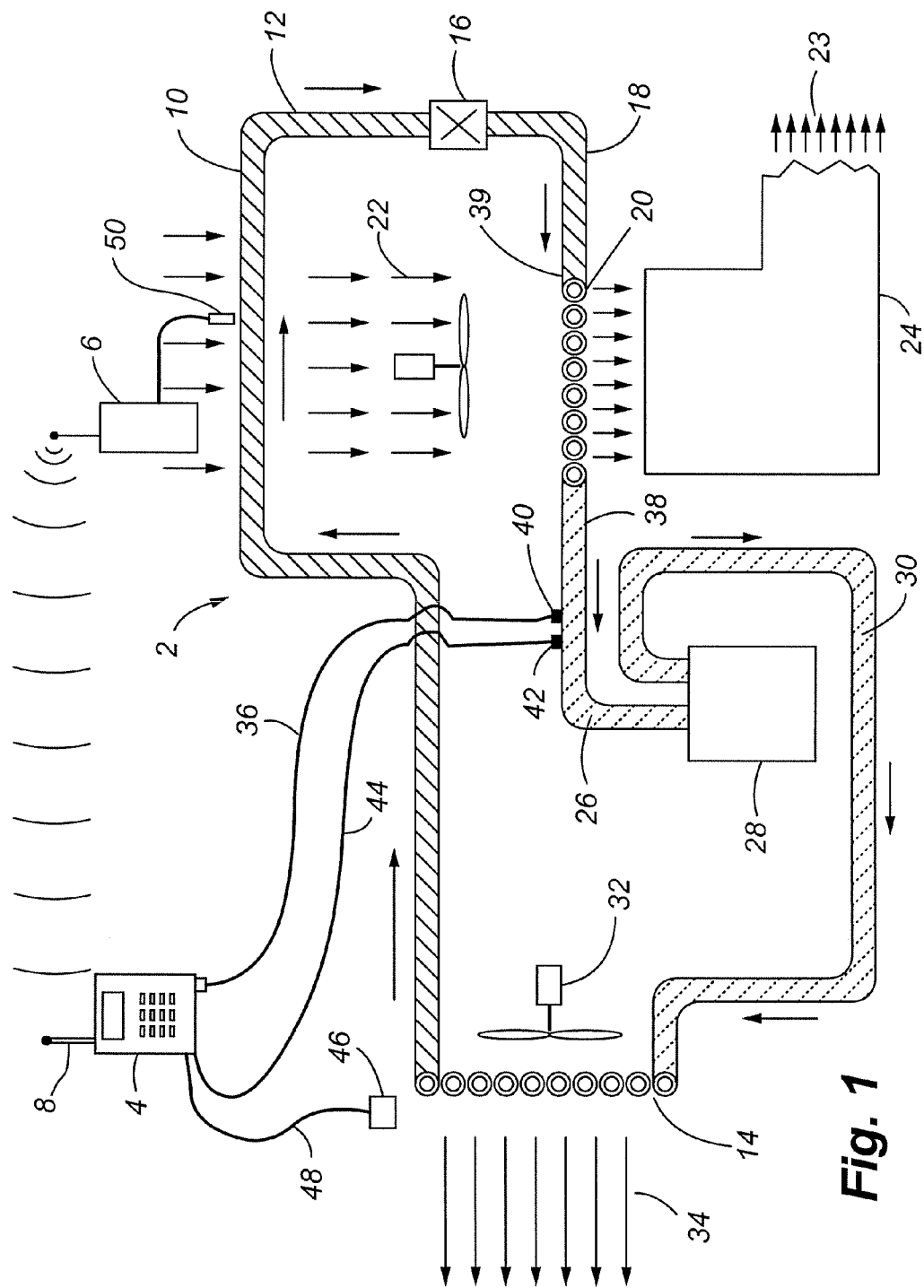
FIG. 1 is a depiction of the present invention shown connected to a schematic of an air conditioning unit.

To assist in the understanding of the present invention the following list of components and associated numbering found in the drawings is provided herein:

| # | Component |
|---|---|
| 2 | Air conditioning system |
| 4 | Monitor |
| 6 | Remote sensing unit |
| 8 | Receiving antenna |
| 10 | Conduit |
| 12 | High pressure, high temperature liquid |
| 14 | Condenser |
| 16 | Expansion valve |
| 18 | Low pressure, low temperature liquid |
| 20 | Evaporator |
| 22 | Return air |
| 23 | Cool air |
| 24 | Air duct |
| 26 | Low pressure hot vapor |
| 28 | Compressor |
| 30 | High temperature, high pressure vapor |
| 32 | Fan |
| 34 | Exhaust air |
| 36 | Suction pressure line |
| 37 | Auxiliary pressure line |
| 38 | Low pressure, exit side of the evaporator |
| 39 | High pressure entry side of the evaporator |
| 40 | Suction pressure probe |
| 42 | Suction temperature sensor |
| 44 | Suction temperature line |
| 46 | Unit temperature sensor |
| 48 | Unit temperature line |
| 50 | Probe |
| 52 | Display |
| 54 | Superheat display |
| 54 | User interface |
| 56 | Diagnosis |
| 58 | Refrigerant type |
| 60 | Button |
| 62 | C-clamp |
| 64 | Probe line |
| 66 | Transmitting antenna |
| 68 | Auxiliary temperature probe jack |
| 70 | Probe holder |

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION

Referring now to FIGS. 1–4, a monitoring device for use with a common household or an industrial air conditioning system 2 is shown. More specifically, embodiments of the present invention utilize a handheld monitoring device 4 that senses and stores pressure and temperature readings at various locations taken along the air conditioning system 2, and a remote sensor unit 6 for testing at least one temperature of the inside of the structure being cooled. The remote sensing unit 6 and the handheld monitoring unit 4 each include antennas for sending and receiving data, respectively. The remote sensing unit 6 is placed inside the structure wherein real time signals related to the temperatures being monitored are sent directly to the receiving antenna 8 of the monitor 4 to allow a technician to quickly ascertain the condition of the air conditioning system 2, diagnose faults in the system 2, and assess proper procedures in correcting such defects, if they exist. The monitoring device 4 allows the technician to ascertain a plurality of temperature and pressure readings without having to manually gather data at multiple locations on the air conditioning system 2, thus the present invention saves time and money, and is more accurate than prior art systems.

Referring now to FIG. 1, a schematic of a common air conditioning system 2 is shown along with the monitoring device 4 of one embodiment of the present invention. Air conditioning systems 2 generally include a conduit 10 for the transference of coolant, such as Freon. High temperature, high pressure liquid 12 coolant is initially passed through the conduit 10 from a condenser 14 to an expansion valve 16. The coolant is then fed through an expansion valve 16 that lowers the pressure and temperature of the liquid coolant. This low pressure, low temperature liquid 18 is then sent through an evaporator 20 that is exposed to warm return air flow 22 from an air duct in the structure. The warm return air flow 22 is of a relatively high temperature in comparison to the fluid in the evaporator 20 such that when the air is put in thermal communication with the coolant in the evaporator 20 heat transfer occurs wherein the air 23 entering into the duct 24 downwind of the evaporator is now cooled. In the evaporator 20, the liquid coolant is supposed to boil and change completely into a vapor phase as a result of the heat transfer process. This low pressure hot vapor 26 is then directed to a compressor 28 that compresses the vapor into a high temperature, high pressure vapor 30 that is directed into the condenser 14 to complete the coolant loop. The high temperature, high pressure vapor 30 in the compressor 14 is exposed to relatively cooler air generated by a fan 32 to initiate heat transfer from the vapor in the condenser 14, wherein the vapor condenses back into a high pressure, high temperature liquid 12. The fan 32 is commonly employed on outdoor central heating units where high temperature exhaust gases 34 are expelled, thereby removing the heat from the structure.

The monitoring unit 21 as shown connects with the air conditioning system 2 at predetermined locations. In accordance with embodiments of the present invention, a suction pressure line 36 is connected to the monitoring unit 4 and to a low pressure side of the evaporator 38 to monitor the suction pressure of the air conditioning system 2 with a pressure sensor 40. As stated above, the suction pressure is related to the suction temperature of the system that is used in the calculations of air conditioning efficiency. In addition, a suction temperature probe 42 is connected to the monitoring system 4 via a suction temperature line 44, that senses the temperature of the coolant at the low pressure side of the evaporator 38. These two readings are critical in determining the superheat condition of the air conditioning system 2. In addition, a unit temperature sensor 46 is provided that is connected to a unit temperature line 48 that feeds information into the monitor 4. Further, a remote sensing unit 6 is connected to a probe 50 that senses the temperature and relative humidity of the return air flow 22 of the structure, which ultimately comes in contact with the low pressure, low temperature liquid 18 in the evaporator 20 during air conditioning use. Those readings are sent to the monitoring system 4 via radio waves. However, one skilled in the art will appreciate that other methods of communication may be used without departing from the scope of the invention.

Figure 2:
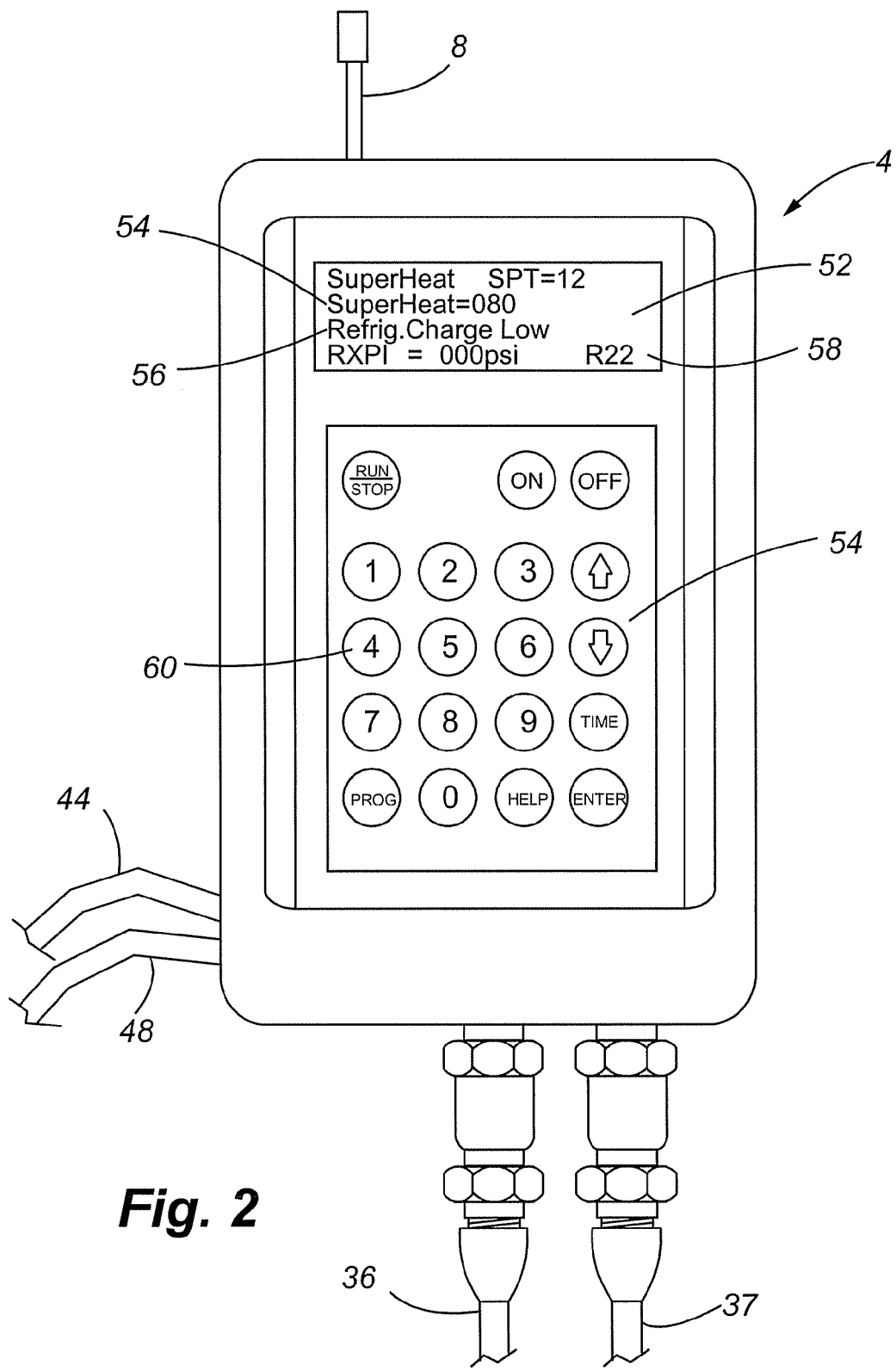
FIG. 2 is a front elevation view of a monitor of the present invention.

Referring now to FIG. 2, a monitor 4 of one embodiment of the present invention is shown. In the illustrated embodiment, a monitor 4 is provided that includes a display 52, a user interface 54, a plurality of ports for the connection of sensor lines 36 & 44, and a receiving antenna 8. The display 52 may contain information related to the superheat condition of the air conditioning system 54, a suggested diagnosis 56 of any problems associated with the air conditioning system, the refrigerant 58 being used, etc. The user interface 54 of the monitor 4 may include a plurality of buttons 60 for the input of data and manipulation of data. The sensor lines used in one embodiment of the present invention include the suction temperature line 44, the unit temperature line 48, and the suction pressure line 36. The monitoring unit 4 is designed to operate on battery power, preferably rechargeable nickel metal hydride batteries that allow for quick recharging when the technician is out in the field. The monitor 4 is also designed to be used with the remote sensing unit to provide quick calculations of air conditioner system conditions within about seven minutes.

In addition, an auxiliary pressure line 37 may be provided for connection to any location on the coolant loop. One embodiment of the present invention senses data related to the entry, or high side, temperature of the evaporator (39, see FIG. 1). The gathered data is fed to the monitor 4 via the auxilliary pressure line 37.

Figure 3:
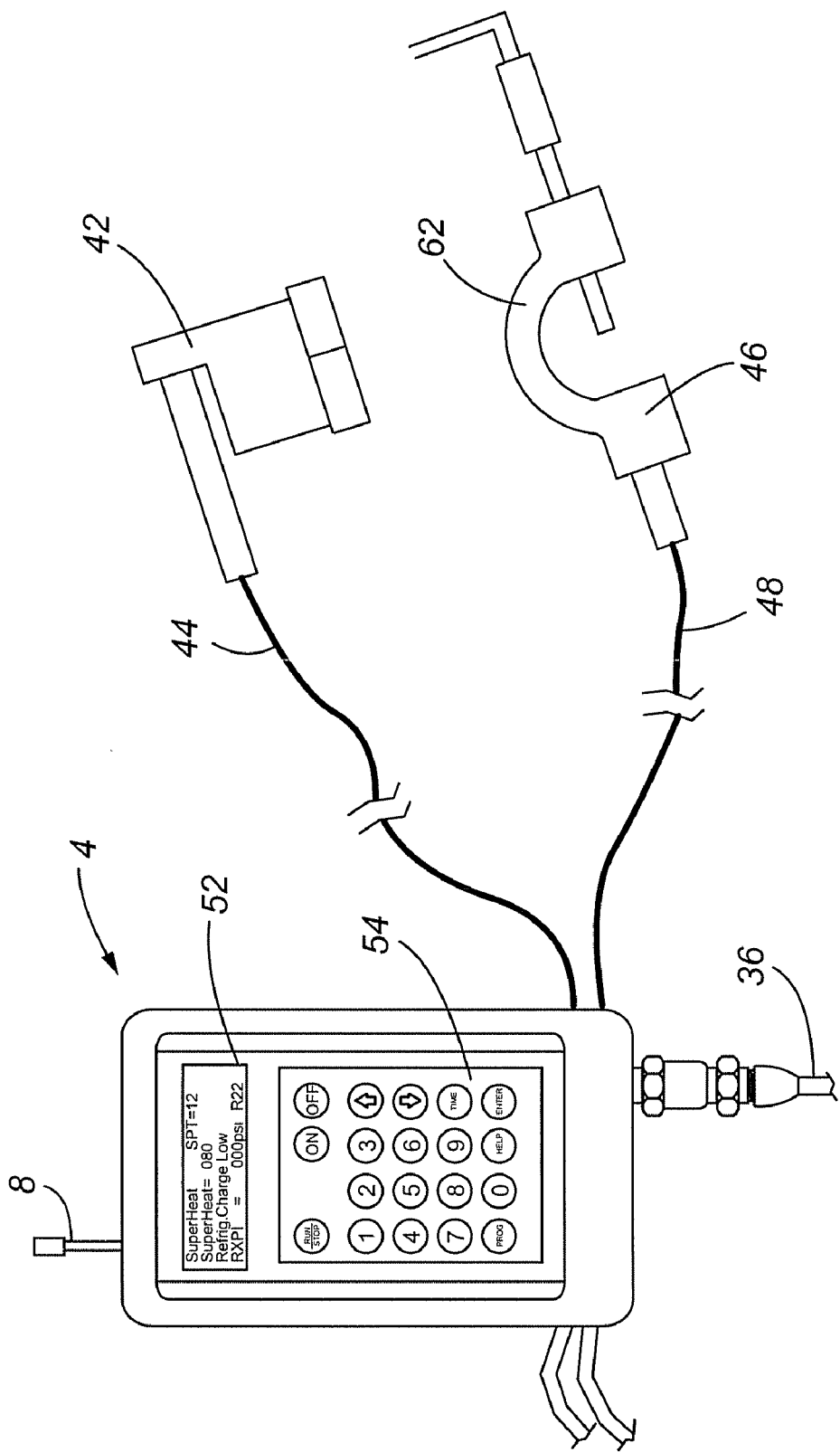
FIG. 3 is a front elevation view of the monitor of the present invention connected to various temperature and pressure sensing devices.

Referring now to FIG. 3, the monitor 4 of one embodiment of the present invention is shown connected to temperature sensing devices. More specifically, one embodiment of the present invention includes a suction temperature sensor 42 that is magnetized to selectively connect to the coolant conduit. In addition, a unit temperature sensor 46 that employs a C-clamp 62 for connection to the air conditioning unit generally found outside of the structure being cooled may be provided. However, one skilled in the art will appreciate that any type of connection method may be used for either type of sensor without departing from the scope of the invention. The suction pressure line 36 of the illustrated embodiment is connected to a pressure tap of the air conditioning unit. The data from all three sensors and the data received from the remote sensing unit is gathered by the monitor 4.

Figure 4:
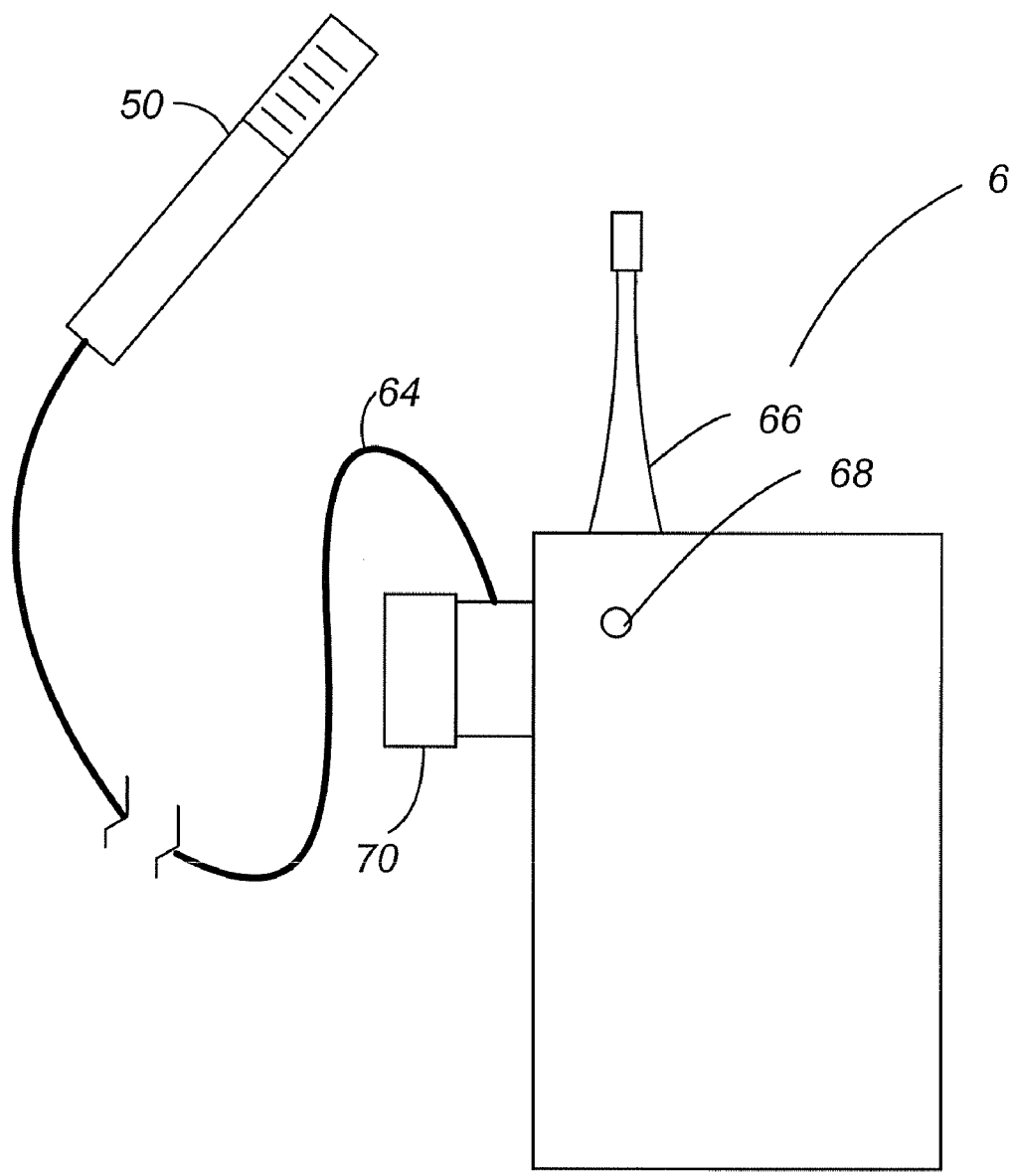
FIG. 4 is a front elevation view of a remote sensing unit connected to a temperature/humidity probe of the present invention.

Referring now to FIG. 4, the remote sensing unit 6 of one embodiment of the present invention is shown. More specifically, embodiments of the present invention may include a remote sensing unit 6 that includes a probe 50 for the sensing of temperature and relative humidity that is connected via probe line 64 to the sensing unit 6. The data obtained from the probe 50 is then transmitted from the remote sensing unit 6 via a transmitting antenna 64 to the primary monitor. The remote sensing unit 6 may also include auxiliary temperature probe jacks 68 for the connection of various other temperature probes. In addition, a probe holder 70 may be provided such that the probe 50 may be safely stored after use to minimize the possibility of damage.

Referring now to FIGS. 1–4, a brief description of one method of use is described. In operation, the technician would place the remote sensor 6 inside the structure with the temperature probe 50 placed within the return air flow 22 of the air conditioning system 2. The technician would then connect the suction pressure temperature sensor 42 and the suction pressure sensor 40 to the coolant conduit 10 outside of the structure. The lines associated with these sensors 36 & 44 would then be connected to the monitor 4. The technician would connect the unit temperature sensor 46 to the air conditioning system 2 via the unit temperature line 48. The monitoring system would then be turned on and the type of refrigerant would be inputted into the monitor 4. More specifically, various air conditioning units utilize different types of refrigerants. Each refrigerant is generally associated with a given number that relates to the material properties and related constants of the refrigerant material. The technician may then enter in the type of tests being conducted or similar types of parameters and initiate the monitoring operation. In approximately seven minutes, while the air conditioner is running, a real time superheat calculation is obtained that allows the technician to assess the condition of the air conditioning system 2. In one embodiment of the present invention, a diagnosis 56 is also outputted on the display 52 of the monitoring device 4 that gives guidance to required alterations to the air conditioning system 2 to effect repairs. For example, coolant may be added or removed, the compressor 28 settings may be changed, fan 32 speeds may be changed, the expansion valve 16 may be replaced, etc. This aspect of the present invention allows for little or no user error such that a technician of relatively little experience may be employed to perform the necessary tasks, which will saves time and money.

Embodiments of the present invention as described herein are designed to be constructed out of common materials, such as plastics, metal, rubber, etc. with liquid crystal or light emitting diode displays. More specifically, all the components of the system are well known in the art, for example the temperature sensors, antennas, pressure taps, temperature probes and RF transmitters, such that the components may be bought off the shelf and assembled with little or no alterations. In addition, the housings of the monitors may be molded from plastic such that any shape or size may be formed. Thus, it is envisioned that the present invention be relatively inexpensive to manufacture.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. An air conditioning system monitor and superheat calculation device comprising:
    a suction temperature sensor;
    a suction pressure sensor;
    a unit temperature sensor for interconnection to a housing of the air conditioning system which is located outside of a structure;
    a remote sensing device having the ability to transmit information wirelessly to a mobile monitor, the mobile monitor also being in communication with the suction temperature sensor, the suction pressure sensor, the unit temperature sensor; and
    wherein the mobile monitor uses at least some of the data gathered from each of the suction temperature sensor, the suction pressure sensor, the unit temperature sensor, and the remote sensing device and outputs a superheat condition of the air conditioning system.

2. The device of claim 1, wherein the remote sensing device includes at least one probe that may be situated in the return air flow of the air conditioning system.

3. The device of claim 2, wherein the remote sensing device is connected to the at least one probe with a line.

4. The device of claim 2, wherein the at least one probe is capable of sensing at least one of a temperature and a relative humidity of the return air.

5. The device of claim 1, wherein the remote sensing device transmits data to the monitoring device with radio waves.

6. The device of claim 1, wherein the remote sensing device includes at least one auxiliary port for the connection of a sensing device.

7. An air conditioning system monitor and superheat calculation device comprising:
    a first temperature sensing means;
    a pressure sensing means;
    a second temperature sensing means for monitoring the temperature of a portion of the air conditioning system that is located on the outside of a structure;
    a remote sensing means that has the ability to transmit information wirelessly to a monitoring means, the monitoring means also being in at least one-way communication with the first temperature sensing means, the pressure sensing means, the second temperature sensing means; and
    wherein the monitoring means uses at least some of the data gathered from each of the first temperature sensing means, the pressure sensing means, the second temperature sensing means, and the remote sensing means and outputs at least a superheat condition of the air conditioning system.

8. The device of claim 7, wherein the remote sensing means is connected to at least one probe.

9. The device of claim 7, wherein the remote sensing means communicates with the monitoring means with radio waves.

10. The device of claim 7, wherein the remote sensing means includes at least one auxiliary port form the connection of a sensing means.

11. The device of claim 7, wherein the remote sensing means is situated in the return air flow of the air conditioning system.

12. A method of monitoring the efficiency of an air conditioning system comprising:
    placing a first temperature sensor;
    placing a pressure sensor;
    placing a second temperature sensor onto to a housing of the air conditioning system which is located outside of a structure;
    connecting the first temperature sensor, the second temperature sensor, and pressure sensor to a monitoring device;
    locating a remote sensing unit that wirelessly communicates with the monitoring device;
    using the monitoring device to obtain temperature and pressure readings directly from the first temperature sensor, the second temperature sensor, and pressure sensor;
    using the monitoring device to wirelessly receive temperature data from the remote sensing unit; and
    using at least some of the data gathered from each of the first temperature sensor, the pressure sensor, the second temperature sensor, and the remote sensing device to obtain a superheat condition of the air conditioning system.

13. The method of claim 12, wherein the remote sensing unit includes a sensing probe that is located adjacent to the return air flow of the air conditioning system.

14. The method of claim 13, wherein the sensing probe is capable of sensing at least one of the relative humidity and temperature of the return air flow.

15. An air conditioning system monitor and superheat calculation device comprising:
- a suction temperature sensor;
- a suction pressure sensor;
- a unit temperature sensor for interconnection to a housing of the air conditioning system which is located outside of a structure;
- a remote sensing device having the ability to transmit information wirelessly to a mobile monitor, the mobile monitor also being in communication with the suction temperature sensor, the suction pressure sensor, the unit temperature sensor; and
- wherein the mobile monitor uses data gathered from each of the suction temperature sensor, the suction pressure sensor, the unit temperature sensor, and the remote sensing device and outputs a superheat condition of the air conditioning system.

\* \* \* \* \*